(No Model.)

E. N. WALKER.
SPRING SNAP.

No. 499,615. Patented June 13, 1893.

Witnesses
John Tannie
Geo. F. Kincaid

Inventor
Ernest N. Walker
by John Wedderburn
his Attorney

UNITED STATES PATENT OFFICE.

ERNEST N. WALKER, OF LAKEVIEW, OREGON.

SPRING-SNAP.

SPECIFICATION forming part of Letters Patent No. 499,615, dated June 13, 1893.

Application filed November 16, 1892. Serial No. 452,217. (No model.)

*To all whom it may concern:*

Be it known that I, ERNEST N. WALKER, of Lakeview, in the county of Lake and State of Oregon, have invented certain new and useful Improvements in Spring-Snaps; and I do hereby declare the following to be a full, clear, and exact description of the invention, such as will enable others skilled in the art to which it appertains to make and use the same.

My invention is an improvement in spring snaps for harness, designed for its simplicity and durability of construction and certainty of operation, and by the use of which it is absolutely impossible for an animal to unfasten itself.

I have set forth fully hereinafter the details of construction and the essential features of my invention, and illustrated them in the accompanying drawings, in which similar letters of reference designate corresponding parts.

Figure 1:
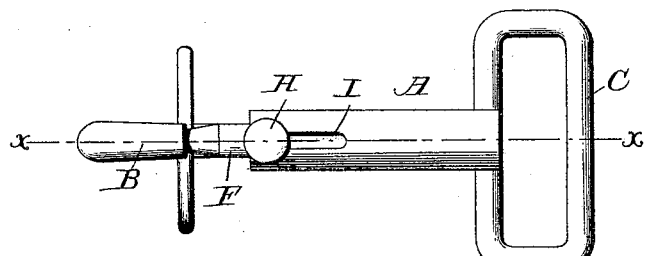
Figure 2:
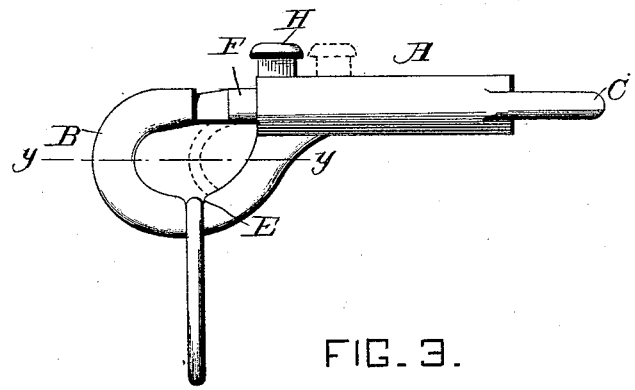
Figure 3:
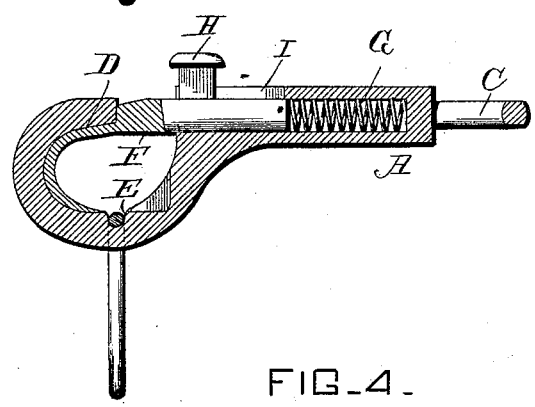
Figure 4:
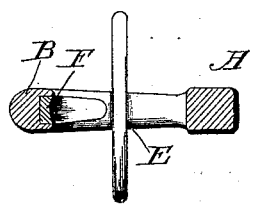

Figure 1 is a front elevation of my invention. Fig. 2 is a side elevation of the same. Fig. 3 is a section through the line $x$—$x$ Fig. 1, and Fig. 4 is a section through the line $y$—$y$ Fig. 2.

A is the main portion or shank of the snap, and B is the bent portion or hook into which the ordinary ring passes.

C is the portion to which the strap or rope is secured and is rigidly connected to the shank A, or may be connected by means of a swivel. The inner upper portion of the hook B is grooved as shown at D in the drawings, while the center of the hook contains the curved notch E. Extending into the hollow central portion of the shank A, is the return piece F, the upper portion of which is hooked in the form of the letter L, and shown in Fig. 2, partly open. The return piece F is kept in a closed position, as shown in Fig. 3, by the spring G, and it is prevented from turning by means of the projection H which passes through the slot I Fig. 1. The upper portion of the piece F is adapted to pass into the notch E and, when the snap is closed, to lie flush with the edge of the hook B as shown in Fig. 3.

It will be readily seen from the foregoing description that before the ring can be unsnapped, it will have to lie in the notch E until the return piece F is placed in the position shown in Fig. 2.

I do not wish to confine myself to any particular form of the notch, groove or hook B.

The construction and arrangement of the several parts of my snap being thus made known the operation and the advantages of the same will, it is thought, be readily understood.

I am aware that changes in the form and proportion of parts of the device herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim, and desire to secure by Letters Patent, is—

1. In an article of the class described, the combination of an outer hook, a groove on the inner surface of said outer hook, an inner sliding piece adapted to fit in said groove, and a notch on the inner surface of said outer hook, said inner piece being adapted to slide past said notch, substantially as and for the purpose set forth.

2. In an article of the class described, the combination of the outer hook B with the inner return piece F, the upper portion of which is adapted to fit in groove D in the hook B, notch E in outer hook B, and spring G by means of which the upper portion of the return piece F is kept flush with the edge of groove D, substantially as and for the purpose set forth.

In testimony whereof I have signed this specification in the presence of two subscribing witnesses.

ERNEST N. WALKER.

Witnesses:
JOE S. FULLER,
W. N. SUTTON.